United States Patent [19]

Russell et al.

[11] 3,833,442

[45] Sept. 3, 1974

[54] METHOD OF LAP-SEAMING A LACQUERED METAL CONTAINER BODY

[75] Inventors: Philip W. Russell, Belmont; Charles W. Simons, Bedford; Francis L. Chupka, Jr., Billerica, all of Mass.

[73] Assignee: W. R. Grace & Co., New York, N.Y.

[22] Filed: Oct. 12, 1972

[21] Appl. No.: 297,124

Related U.S. Application Data

[62] Division of Ser. No. 165,365, July 22, 1971, abandoned.

[52] U.S. Cl.................... 156/331, 117/43, 117/75, 138/146, 138/151, 138/156, 156/82, 156/203, 156/218, 156/291, 161/147, 161/214, 220/67, 220/75
[51] Int. Cl....... C09j 5/02, B65d 7/38, B32b 15/08
[58] Field of Search.......... 117/43, 75; 156/82, 203, 156/218, 291, 331; 161/147, 214; 220/75, 67; 138/146, 151, 156

[56] References Cited

UNITED STATES PATENTS

| | | | |
|---|---|---|---|
| 3,441,469 | 4/1969 | Fitko et al. | 161/186 |
| 3,472,916 | 10/1969 | Anspon et al. | 260/857 L |
| 3,484,403 | 12/1969 | Brunson et al. | 260/23 |
| 3,496,060 | 2/1970 | Pitz et al. | 161/211 |
| 3,550,806 | 12/1970 | Peerman et al. | 220/81 |
| 3,636,136 | 1/1972 | Konopik | 260/857 L |
| 3,733,589 | 11/1973 | Kaiser et al. | 156/218 |

*Primary Examiner*—Charles E. Van Horn
*Assistant Examiner*—Robert A. Dawson
*Attorney, Agent, or Firm*—Charles L. Harness

[57] ABSTRACT

A novel adhesive consisting of a blend of a polyamide with 1 to 15 percent of certain polymer and copolymer additives is described, together with its use in lap-seaming lacquered metal (e.g., tin-free steel or aluminum) containers.

1 Claim, No Drawings

METHOD OF LAP-SEAMING A LACQUERED METAL CONTAINER BODY

This is a division, of application Ser. No. 165,365 filed July 22, 1971 and now abandoned.

This invention is directed to a novel polyamide based adhesive and its use in bonding together lacquered metals, especially for use in making lap seams for containers and cans.

Polyamides per se are known for such uses, and are indeed quite useful under quiescent conditions or conditions not involving great stress. In the presence of wet or dry heat, however, they tend to lose strength and adhesion. The instant invention is based on the discovery that the addition of small amounts of certain polymers and copolymers to polyamides will greatly improve adhesion.

THE ADHESIVES

The adhesives are prepared by mixing certain polymers or copolymers with a polyamide or mixture of polyamides. Substantially any polyamide is suitable to make the blends of this invention. Preferred polyamides are nylon 11, nylon 12, nylon 6, nylon 6,10, used singly or in mixtures. A suitable polyamide mix (herein, Polyamide Mix A) consists of:

25 to 40 weight percent nylon 12
5 to 30 weight percent nylon 6
balance, nylon 6,10.

Within the above ranges, a preferred composition is Polyamide Mix B:

50 weight percent nylon 6,10
30 weight percent nylon 12
20 weight percent nylon 6

The adhesives of this invention are made by blending into the polyamide, 1 to 15 weight percent of the following polymer and copolymers. The weight percent is based on the total weight of polyamide plus additive.

Polyvinyl Acetate (PVA)

Any commercial PVA is suitable. The PVA used in this work had the following properties: high molecular weight, with a melt index of 17.8 g./10 min. at 44 psi and 190°C. (ASTM D 1238–65T).

Copolymer EVA

This is commercially available ethylene-vinyl acetate copolymer having 18 to 33 percent vinyl acetate content (typically 18 percent) and a melt index of 125–175 g/10 min. (ASTM D 1238–65T).

Copolymer EEA

This is a commercially available ethylene-ethyl acrylate copolymer. The ethyl acrylate content is about 18–33 percent, and the melt index is 5 to 20 g/10 min. (ASTM D 1238–65T at 44 psi and 190°C.)

Quite small amounts of polymer (or copolymer) additive improve the adhesion characteristics of polyamides. In the following experiment, the general laboratory procedure hereinafter described was followed, except that the Polyamide Mix B was used.

Without polymer additive, this Base Mix gave a peel test of 15 lb./in. at break on a Dillon Universal Tension Tester. With 1 percent of ethylene-vinyl acetate copolymer, the peel test was 20 lb./in., and with 2 percent with was 43 lb./in.

Additional polyamides suitable for blending with the herein described polymers and copolymers for use in this invention, can be made by well-known processes, as set forth, for example, in the following patents:

U.S. Pat. No. 2,839,219
U.S. Pat. No. 2,840,264
British Pat. No. 1,024,535
British Pat. No. 991,514
Belgian Pat. No. 671,086
Belgian Pat. No. 659,059
Belgian Pat. No. 681,635
Canadian Pat. No. 752,931
French Pat. No. 1,523,852

Blend of hard and soft polyamide designed for side seam cement.
This gives a high peel strength polyamide of the Milve type available from General Mills, Inc.
This gives a low-melting polyamide which can be used to lower the melting point of higher melting polyamides.

As will be noted from a study of these patents, many of these polyamides are excellent metal adhesives in their own right. They are, however, improved, at least for making lap side seams, by addition of polyvinyl acetate and the copolymers as above described. The particular polyamide is not critical.

In one of its broad aspects, the invention is directed to a method of bonding together surfaces of lacquered metallic elements, which method comprises applying to at least one of said surfaces the adhesive of this invention as above broadly described, heating said adhesive to a temperature between about 350°F. and 550°F. to melt said adhesive, holding said surfaces pressed against each other with the molten adhesive disposed therebetween, maintaining said adhesive in a molten state for from about 0.001 seconds to about 2 minutes to permit wetting of said surfaces by the adhesive, and cooling said adhesive to a temperature below its melting point. The bond is formed when the adhesive solidifies.

As has been mentioned, the adhesives of this invention are outstandingly useful in forming lap seams of lacquered metal can bodies. In this use, they can be applied in any conventional manner. In one typical and convenient process the adhesive can be melted and extruded as a ribbon onto the wall edge of the can blank, then allowed to cool and resolidify. After this; the adhesive is remelted with a gas flame, the can blank is folded to form a cylinder, and the seam is bumped with a water-cooler contacting device to solidify the adhesive. This same procedure is old in the art for nylon adhesives per se (i.e., those not containing the polymeric additives of this invention). The instant adhesives, however, give results greatly superior to the prior art results, in their greater adhesion relatively prolonged exposure to hot or boiling water. After the lap seam is thus formed, end covers can be added by conventional procedures.

The following examples illustrate without limiting the invention.

EXAMPLE 1

Using one of the adhesives of this invention (nylon 11 plus 15 percent ethylene-vinyl acetate copolymer containing 18 percent vinyl acetate) for the side seam, a straight walled cylindrical can body is formed from a blank of lacquered tin free steel 6 mils thick. A coating of the molten adhesive is extruded onto the edge of the blank surface of the can body to provide an adhesive band about 6 millimeters wide and about 0.25 millimeters thick. The coating is allowed to cool. Then it is remelted with a gas flame and the walls folded over to form a lap seam, followed by cooling to solidify the adhesive. A commercial can sealing device is used to seal end covers to the can stock in the conventional manner.

EXAMPLE 2

The procedure of Example 1 is repeated except that after inserting the bottom end cover, the assembly is cured, filled three-fourths full with chilled carbonated water, and the top cover applied as described in Example 1. The can is then held at 70°C. for 45 minutes. This results in the generation of internal pressure of the order of 80–90 psi, such as is encountered in pasteurization of beer. The top cover "domes" considerably after about 5 minutes, but all the seams hold intact.

EXAMPLE 3

In this example, the Polyamide Mix B is used. To this is added 15 percent of a copolymer of ethylene and ethyl acrylate, above described. The blend is sheeted out and cut into ribbons which have a thickness of 0.006 inch and a width of 0.25 inch. The ribbons are used to form the side seam cement for beer cans.

Steel black plate, 0.0065 inch thick, is used to make the cans. Rectangular blanks are cut which are sufficient in size to form conventional 12-ounce beer cans. Each blank is sprayed internally and externally with epoxy-phenol lacquer and made into a tube wherein the overlap of the side edges measured 0.26 inch. The adhesive ribbon is placed lengthwise between the overlapping edges of the tube. The lap area of the overlapping edges is then placed under a pressure of approximately 4,000 psi and heated to 275°C. After 1½** minutes at 275°C. the heat is removed but the pressure is maintained 10–15 seconds during cooling. The resulting side seam is 5 inches long, the overlap is 0.26 inch and the adhesive thickness of 0.007 inch.

Five tubes are made in this manner. The ends of each tube are flanged with a hand flanger. A can end is seamed to one end of each tube, and the cans are filled with chilled (4°C.) beer (2.4 volumes $CO_2$ nominally, head space 7/16 inch). The other can end is then double seamed on. The cans are placed in a retort containing water at 160°F. and pasteurized at this temperature for 75 minutes. They are then cooled over a 15 minute period to 90°F. before being removed from the retort. All the cans are pasteurized successfully and none display any leakage.

In developing the blends that give superior results in accordance with this invention, several techniques were worked out on a laboratory scale for reproducing end use conditions with samples, much more severe than actual consumer conditions anticipated with commercial can stock. These techniques are given in the section following; it will be noted that many of these tests (mixing, application of adhesives, etc.) are replicas in miniature of steps in the commercial manufacture of cans.

Sample Preparation

Commercial high molecular weight polyamide resins (pellet form) were dry blended with 1–30 percent by weight of the pelletized, polymer or copolymer additive. The mixtures were extruded using a Brabender Plastograph with a die head temperature range of 425°–525°F. To give a more homogeneous mix, the extrudate was chopped and re-extruded. The material was chopped again or pelletized. In this form the blend was used as a side seam adhesive by the herein described process.

Physical Testing

The adhesives were prepared for testing by placing the chopped material in a mold which would produce a film 6 inches × 6 inches × 0.007 inch. The mold containing the sample was placed in a heated platen press maintained at a temperature in excess of the melting point of the sample. The material was subjected to a pressure of 10,000 pounds. The resulting sheet could be cut to any desired dimensions for testing purposes.

Three major tests were carried out to determine the value of the nylon-polymer blends as side seam adhesives:

a. Lap Shear Test

The metal substrates obtained from can bodies and containing an inside coating of an epoxy phenolic lacquer were cut into 3–5 inches × 1.00 inch sections. Two metal strips were bonded utilizing a cut section of adhesive (1 inch × 1.00 inch) to give a lap shear joint with approximately a 1.00 inch overlap. The adhesive bond thickness is 0.003 inch.

Bonding time was 20 seconds at 525°F. and 20,000 pounds in a flat platen press. The platen was limited in its travel by metal shims which insure a 0.003 inch glue line. The specimens were removed from the press and immediately plunged into cold tap water. The specimens were aged for a minimum of 24 hours prior to testing.

The samples for the lap shear test were tested on an Instron Tension Tester utilizing a crosshead speed of 1 inch per minute.

The load was recorded at failure and the bond strength calculated in psi. It is known that bond strengths of greater than 2,400 psi will usually result in metal failure with the metal gauges now used for can making. We have found metal rupture rather than adhesive failure in our systems.

b. Peel Strength

Specimens for peel test were prepared as outlined above except the adhesive section measured: 1 inch × 1 inch × 0.003 inch.

After bonding, the samples were tested on an Instron Tension Tester at a crosshead speed of 1 inch per minute.

c. Heat Tolerance

Cans are normally subjected to a baking process after their manufacture. The side seam must survive the baking process. A bake test was devised to simulate this condition.

The test specimens were identical to those used for the lap shear tests. The test specimens were bent into a circular shape approximating the circumference of a beer can and clamped into place with a special jig devised for this purpose. The samples were placed in an oven maintained at 360°F. for 6 minutes, after which the specimens were removed and inspected.

Results

The lap shear tests were carried out by the method previously outlined. Invariably, when using the adhesives of this invention, metal rupture occurred rather than adhesive bond failure. Metal rupture took place at approximately 2,000 psi.

The addition of ethylene-vinyl acetate copolymers to polyamides did not adversely affect the heat tolerance of the nylon adhesive system under consideration. The test used was the previously described Bake Test.

Highly relevant data on the adhesive blends of this invention as side seam adhesives was gathered from the peel tests. The peels were recorded as Peel (maximum) and Peel (average). The Peel (maximum) was calculated from the maximum peak height recorded by the tension tester. The Peel (average) values were obtained by averaging the area under the curve and perhaps is the more meaningful data.

For the work presented in Table I, ethylene-vinyl acetate copolymer ("EVA"—18 percent vinyl acetate content; melt index = 125–175 g/10 min.) and nylon 11 adhesive systems were prepared. The amount of EVA in the systems was varied from 5 to 25 percent. The addition of EVA appreciably increased the peel strength up to a 15 percent concentration beyond which the peel strength dropped off considerably. The results are tabulated in Table I.

TABLE II

Comparative Peel Strength Data
The effect of ethylene-vinyl acetate addition on nylon 12 and on a nylon mixture.

| Polyamide System | EVA Additive (% Conc.) | Peel Strength (lb./in) | |
|---|---|---|---|
| | | Maximum | Average |
| nylon 12 | — | 36.5 | 29.7 |
| nylon 12 | 5 | 47. | 40. |
| 70% nylon 6,10<br>25% nylon 12<br>5% nylon 6 | — | 25.9 | 12.4 |
| 70% nylon 6,10<br>25% nylon 12<br>5% nylon 6 | 7 | 44.3 | 24.4 |
| 70% nylon 6,10<br>25% nylon 12<br>5% nylon 6 | 10 | 38.3 | 23.8 |

Table III presents the results of an experiment in

TABLE III

Comparative Peel Strength Data
The effect of various additives on the peel strength of Nylon 12.

| Polyamide | Additive and Concentration | Additive Composition | Additive Melt Index (g/10 min.) | Peel Strength (lb./in) | |
|---|---|---|---|---|---|
| | | | | Maximum | Average |
| nylon 12 | — | — | — | 59 | 45.3 |
| nylon 12 | 7% EVA | 18% VA[1] | 2.5 | 80.3 | 64.6 |
| nylon 12 | 7% EVA | 20% VA | 28 | 71.6 | 57.6 |
| nylon 12 | 7% EVA | 18% VA | 125–175 | 83.6 | 62.6 |
| nylon 12 | 7% EVA | 25% VA | 1.6–2.4 | 83.8 | 67.3 |
| nylon 12 | 7% EVA | 25% VA | 335–465 | 84 | 66.6 |
| nylon 12 | 7% EVA | 28% VA | 350 | 84 | 69.3 |
| nylon 12 | 7% EVA | 28% VA | 20 | 90.6 | 76 |
| nylon 12 | 7% EVA | 28% VA | 1.2 | 93.6 | 71.6 |
| nylon 12 | 7% EVA | 33% VA | 20 | 95 | 73.6 |
| nylon 12 | 7% EVA | 33% VA | 5 | 85.3 | 71.6 |
| nylon 12 | 7% EEA | 18% EA[2] | 20 | 85.6 | 72 |
| nylon 12 | 7% EEA | 18% EA | 5–7 | 89.3 | 76.6 |
| nylon 12 | 7% PVA[3] | 100% VA | | 83.3 | 63.3 |

[1] VA = vinyl acetate
[2] EA = ethyl acrylate
[3] PVA = Polyvinylacetate

TABLE I

Comparative Peel Strength Data
The effect of EVA concentration on the peel strength of Nylon 11 and EVA blends.

| Polyamide | EVA Additive (% Conc.) | Peel Strength (lb./in) | |
|---|---|---|---|
| | | Maximum | Average |
| nylon 11 | — | 31.3 | 11.3 |
| nylon 11 | — | 23.1 | 13. |
| nylon 11 | 5 | 40.5 | 29.5 |
| nylon 11 | 7 | 42.9 | 28.3 |
| nylon 11 | 10 | 36.2 | 26.1 |
| nylon 11 | 15 | 38. | 30.7 |
| nylon 11 | 20 | 24.5 | 10.3 |
| nylon 11 | 25 | 16.6 | 6.7 |

Experiments were carried out which exhibited that the addition of ethylene-vinyl acetate copolymers increased the peel strength of nylons in general. An ethylene-vinyl acetate copolymer (18 percent vinyl acetate, melt index = 125–175 g/10 min.) was blended with nylon 12 and in a nylon mixture. The results of this experiment may be found in Table II.

which the additives were varied. In this experiment, the polyamide system and the percent concentration of additive was held constant. It was observed that in addition to ethylene-vinyl acetate copolymers (EVA) both ethylene-ethyl acrylate copolymers (EEA) and polyvinyl acetate (PVAC) increased the peel strength of polyamides. A series of EVA copolymers was tested. These differed in their vinyl acetate content and melt indices. As seen from Table III, an increase in melt index (with the percent of vinyl acetate constant) had no apparent effect on the peel strength of the nylon-EVA blend. However, as the percent of vinyl acetate was increased in the additive from 18 to 33 percent, the peel strength of the blends gradually increased.

The Can Body

The can blank material of the container should be metal, and it is essential that it be lacquered, but the can material is otherwise not critical. Black iron plate (not tin-coated) can be used. Commercial tin plate, tin-free steel, or aluminum stock is preferred. The shape of the container can be varied at will, so long as the walls can be folded to form a side seam. Conventional cylindrical stock is cheapest and is entirely suitable for use in this invention. As mentioned, lacquered stock must be used. The lacquer can be a conventional commercial lacquer, e.g., an epoxy-phenolic lacquer deposited from solvent solution, then baked.

The end covers do not form any part of this invention; they can be of any conventional type, e.g., of the type that would normally be opened with a rim wheel cutter; of the type normally opened with a punch opener; of the type having a pull-out panel portion, and the like. The cover can also be of the type which is to remain intact when the container is opened, for example, in the case where the container is opened with a key, as is commonly the case with canned meats, sardines, etc.

The finished container prepared according to the process of this invention can be used to contain any conventional material, for example, items under pressure such as biscuit dough, ground coffee, and alcoholic and non-alcoholic carbonated beverages; items not under pressure including beans, vegetables, soups, pet foods, condensed milk and frozen fruit juices; and vacuum-packed materials, such as ground coffee. It even can be used to contain inedibles such as tennis balls.

The container itself may be, but is not necessarily round in section. It can be rectangular, for example, for use for meats, sardines, peppers, spices, and the like.

What is claimed is:

1. The method of lap-seaming a lacquered metal container body with an adhesive consisting of (a) 85 percent of a polyamide mixture consisting of 50 percent nylon 6,10; 30 percent nylon 12; and 20 percent nylon 6; and (b) 15 percent of an ethylene/ethyl acrylate copolymer; said method comprising applying the said adhesive to at least one of the seams of the container body, heating said adhesive to a temperature between about 350° F. and 550° F. to melt said adhesive, holding said seams pressed against each other with the molten adhesive disposed therebetween, maintaining said adhesive in a molten state for from about 0.001 seconds to about two minutes to permit wetting of said surfaces by the adhesive, and cooling said adhesive to a temperature below its melting point.

* * * * *